US009302387B1

(12) United States Patent
Brown et al.

(10) Patent No.: US 9,302,387 B1
(45) Date of Patent: Apr. 5, 2016

(54) SYSTEMS, METHODS, APPARATUSES FOR DISCONNECTING A CABLE FROM A RAILCAR

(71) Applicant: Gypsum Management and Supply, Inc., Tucker, GA (US)

(72) Inventors: Michael R. Brown, Hastings, MN (US); Thomas A. Keely, Mesquite, NV (US)

(73) Assignee: GYPSUM MANAGEMENT AND SUPPLY, INC., Tucker, GA (US)

( * ) Notice: Subject to any disclaimer, the term of this patent is extended or adjusted under 35 U.S.C. 154(b) by 0 days.

(21) Appl. No.: 14/504,813

(22) Filed: Oct. 2, 2014

(51) Int. Cl.
*B25J 1/04* (2006.01)

(52) U.S. Cl.
CPC .......................................... *B25J 1/04* (2013.01)

(58) Field of Classification Search
CPC ...................................... B25J 1/02; B25J 1/04
USPC ................ 294/9, 18, 22, 23.5, 191, 209–211; 254/131, 132
See application file for complete search history.

(56) References Cited

U.S. PATENT DOCUMENTS

| | | | | | |
|---|---|---|---|---|---|
| 589,945 | A * | 9/1897 | Groat | ............................. | 294/24 |
| 4,183,503 | A * | 1/1980 | Ward | ...................... | B66F 15/00 254/131 |
| 4,395,840 | A * | 8/1983 | Banks, Jr. | ...................... | 43/17.2 |
| 4,615,555 | A * | 10/1986 | Bateham | ....................... | 294/104 |
| 4,650,232 | A * | 3/1987 | Perry | .................... | B66F 19/005 254/131 |
| 5,553,905 | A * | 9/1996 | Bentivegna | ..................... | 294/24 |
| 5,609,325 | A * | 3/1997 | DeArmond | .............. | A01B 1/16 254/132 |
| 6,070,924 | A * | 6/2000 | Sweetman | ...................... | 294/24 |
| 6,467,823 | B1 * | 10/2002 | Brekken | ....................... | 294/211 |
| 6,478,352 | B1 * | 11/2002 | Fredrickson | .................... | 294/15 |
| 8,544,916 | B2 * | 10/2013 | Acquah | ......................... | 294/175 |
| 2004/0065452 | A1 * | 4/2004 | Baker | ...................... | A01B 1/16 172/378 |

* cited by examiner

*Primary Examiner* — Dean Kramer
(74) *Attorney, Agent, or Firm* — Sutherland, Asbill & Brennan LLP

(57) ABSTRACT

A tool for disconnecting a cable from a railcar is disclosed. The tool includes an elongated body having a first end and a second end. The tool also includes a handle portion disposed about the first end of the elongated body. Moreover, the tool includes an engagement member disposed about the second end of the elongated body. The engagement member may be configured to engage the cable.

12 Claims, 4 Drawing Sheets

SYSTEMS, METHODS, APPARATUSES FOR DISCONNECTING A CABLE FROM A RAILCAR

FIELD OF THE DISCLOSURE

The disclosure generally relates to a railcar tool and more particularly relates to systems, methods, and apparatuses for disconnecting a cable from a railcar.

BACKGROUND

A railcar may be loaded with various types of cargo. The size and shape of the cargo may vary. In order to ensure that the cargo is secured within the railcar, cargo straps (such as cables or the like) may be used. For example, the cargo may be placed within the railcar, and one or more cables may be fastened about the railcar to ensure that the cargo is secured. Once the railcar reaches its destination, the cargo may be removed from the railcar by unfastening the cables. Often, the cables may be fastened about the roof of the railcar. In this manner, in order to disengage the cables from the railcar, someone typically climbs on top of the railcar to access the cables. Climbing on top of the railcar, particularly in a rail yard or other industrial setting, can be a dangerous endeavor. Accordingly, there is a need for a tool to assist in disengaging a cable from a railcar, particularly the roof of the railcar, from the ground level.

SUMMARY

Some or all of the above needs and/or problems may be addressed by certain embodiments of the systems, methods, and apparatuses disclosed herein. According to an embodiment, a tool for disconnecting a cable from a railcar is disclosed. The tool may include an elongated body having a first end and a second end. The tool also may include a handle portion disposed about the first end of the elongated body. Moreover, the tool may include an engagement member disposed about the second end of the elongated body. The engagement member may be configured to engage the cable.

Other features and aspects of the systems, methods, and apparatuses disclosed herein will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Described below are embodiments of a railcar tool for disconnecting a cable from a railcar. The disclosure also describes individual components of the railcar tool. Methods of manufacturing and/or using the railcar tool are also disclosed. The railcar tool may enable a user to disconnect a cable from a railcar. For example, the user, standing at ground level, may disconnect the cable from the railcar using the railcar tool. That is, the railcar tool does not require that the user climb atop the railcar in order to disconnect the cable from the railcar.

The railcar tool may include an elongated body having a first end and a second end. A handle portion may be disposed about the first end of the elongated body, and an engagement member may be disposed about the second end of the elongated body. The engagement member may be configured to engage the cable. In some instances, the engagement member may be V-shaped. The engagement member may be any size, shape, and/or configuration suitable to engage the cable.

In some instances, the railcar tool may include a crossbar attached to the elongated body. The crossbar may be substantially transverse to the elongated body. The cross bar may extend out from one or both sides of the elongated body. In some instances, multiple crossbars may be used. The crossbar may be located nearer the first end of the elongated body than the second end of the elongated body. In this manner, the crossbar may be spaced apart from the handle portion. The crossbar may include a grip or the like. The crossbar may be detachable from the elongated body.

The handle portion may be detachable from the elongated body. Similarly, the engagement member may be detachable from the elongated body. In some instances, the elongated body may be telescopic. In this manner, the railcar tool may be disassembled and reassembled as need. In other instances, the railcar tool may be a unitary structure. For example, the elongated body and the engagement member may be welded together or the like. Any means may be used to assemble the various components of the railcar tool.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Figure 1:
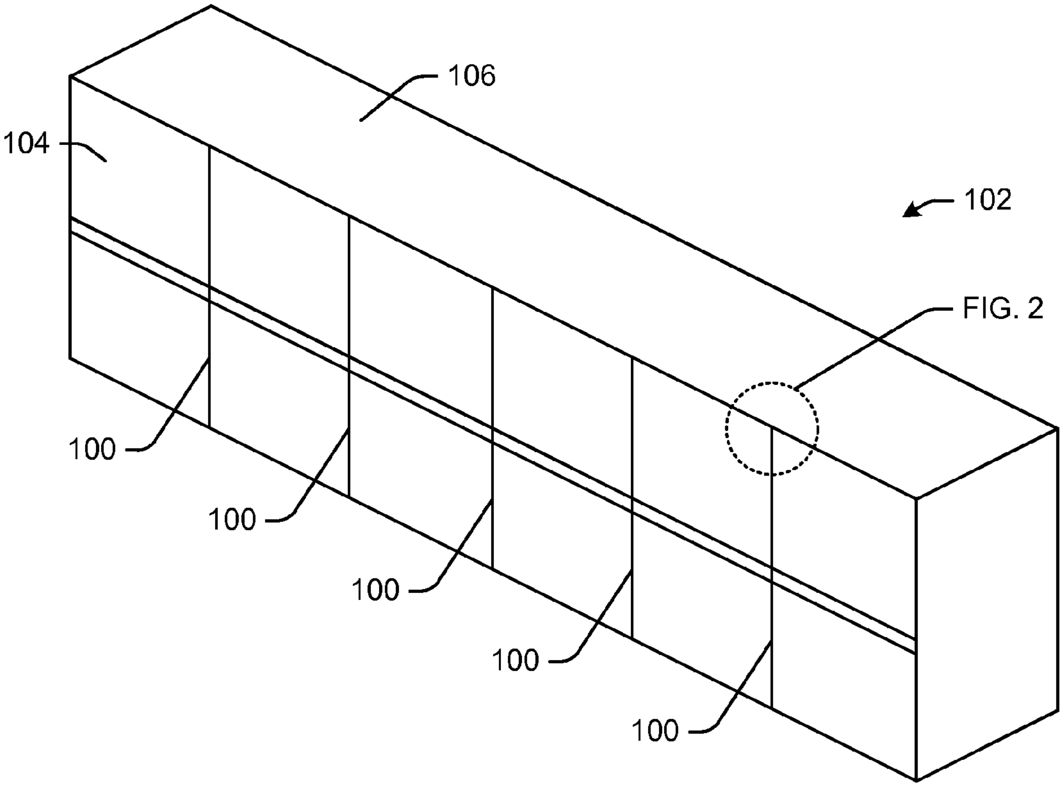
FIG. 1 schematically depicts a railcar assembly in accordance with one or more embodiments of the disclosure.

FIGS. 1-4 schematically depict systems, methods, apparatuses for disconnecting a cable 100 from a railcar 102. In some instances, as depicted in FIG. 1, the railcar 102 may be a center beam railcar or the like with a box beam top member. Any type of railcar may be used. The railcar 102 may be loaded with various types of cargo 104. The size and shape of the cargo 104 may vary. In some instances, in order to ensure that the cargo 104 is secured within the railcar 102, one or more cables 100 (or other types of cargo straps, wires, bands, etc.) may be used. For example, the cargo 104 may be placed within the railcar 102, and the one or more cables 100 may be fastened about the railcar 102 to ensure that the cargo 104 is secured within the railcar 102.

Figure 2:
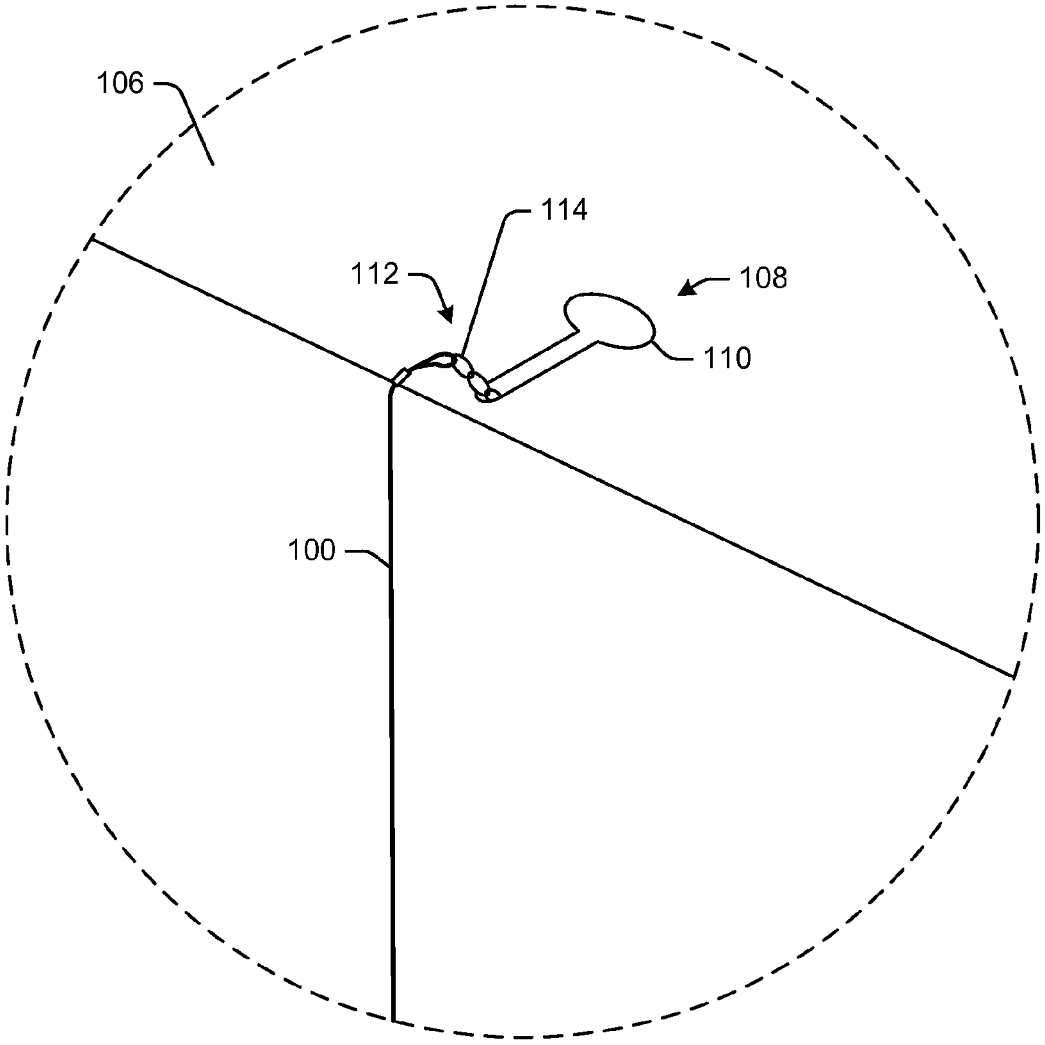
FIG. 2 schematically depicts a portion of a railcar assembly in accordance with one or more embodiments of the disclosure.

In some instances, the cables 100 may be fastened to the top 106 of the railcar 102. For example, as depicted in FIG. 2, the top 106 of the railcar 102 may include a slot 108, such as a keyhole slot 110, configured to receive an end 112 of one of the cables 100. Any type of fastening device may be used to secure to the cable 100 to the top 106 of the railcar 102. For example, the cable 100 may include a chain linked end 114 or the like that may be positioned within the keyhole slot 110. The cable 100 may be tightened about the railcar 102 by a rachtet or the like. For example, an opposite end of the cable 100 may be fastened to the bottom of the railcar 100.

Figure 3:
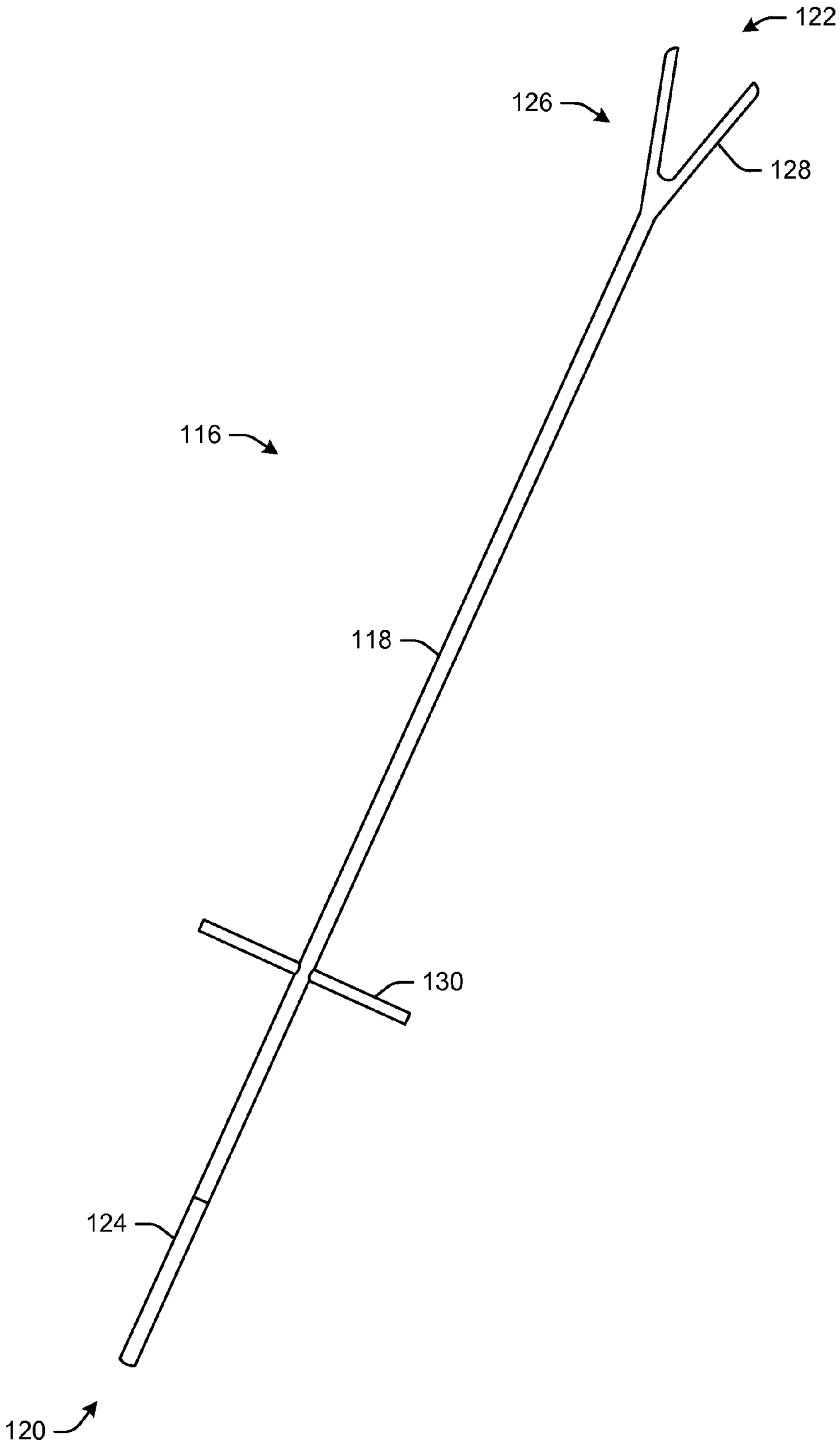
FIG. 3 schematically depicts a railcar tool in accordance with one or more embodiments of the disclosure.

Once the railcar 102 reaches its destination, the cargo 104 may be removed from the railcar 102 by removing the cables 100. In this manner, the chain linked end 114 of the cable 100 should be removed from the keyhole slot 110 at the top 106 of the railcar 102. Access to the top 106 of the railcar 102, however, can be difficult and/or dangerous. Accordingly, as depicted in FIG. 3, a railcar tool 116 is disclosed herein for disconnecting the cable 100 from the railcar 102. The railcar tool 116 may enable a user to disconnect the cable 100 at the top 106 of the railcar 102 from the ground level. That is, the railcar tool 116 does not require that the user climb atop the railcar 102 in order to disconnect the cable 100 from the railcar 102.

In an embodiment, the railcar tool 116 may include an elongated body 118. The elongated body 118 may include a first end 120 and a second end 122. The elongate body 118 may be a pole-like structure. A handle portion 124 may be disposed about the first end 120 of the elongated body 118. In some instances, the handle portion 124 may include a grip or other type of graspable surface. In this manner, the handle portion 124 may be configured to be grasped by a user. The handle portion 124 enables the user to maneuver the railcar tool 116.

The railcar tool 116 also may include an engagement member 126 disposed about the second end 122 of the elongated body 118. The engagement member 126 may be configured to engage the cable 100. In some instances, the engagement member may be V-shaped 128. The engagement member 126 may be any size, shape, and/or configuration suitable to engage the cable 100. For example, the engagement member 126 may be T-shaped, L-shaped, C-shaped, U-shaped, etc. The V-shaped engagement member 128 may be guided by a user along the cable 100. The user may press the V-shaped engagement member 128 against the cable 100 to remove the chain linked end 114 of the cable 100 from the keyhole slot 110 at the top 106 of the railcar 102. For example, the user may manipulate the V-shaped engagement member 128 to apply a force to the chain linked end 114 of the cable 100. The length of the elongated body 118 may enable the user, standing at ground level, to position and press the V-shaped engagement member 128 against the cable 100 to remove the chain linked end 114 of the cable 100 from the keyhole slot 110 at the top 106 of the railcar 102.

In some instances, the user may twist the elongated body 118 while applying the force in order to disengage the chain linked end 114 of the cable 100 from the keyhole slot 110 at the top 106 of the railcar 102. For example, the railcar tool 116 may include a crossbar 130 attached to the elongated body 118. The crossbar 130 may be grasped by the user. The crossbar 130 may enable the user to apply a twisting motion (torque) to the V-shaped engagement member 128. The crossbar 130 may be substantially transverse to the elongated body 118. The crossbar 130 may extend out from one or both sides of the elongated body 118. In some instances, multiple crossbars 130 may be used. The crossbar 130 may be located nearer the first end 120 of the elongated body 118 than the second end 122 of the elongated body 118. In this manner, the crossbar 130 may be spaced apart from the handle portion 124 so as to enable the user to grasp the handle portion 124 with one hand and the crossbar 130 with the other. The crossbar 130 may include a grip or other type of graspable surface. The crossbar 130 may be detachable from the elongated body 118. For example, the elongated body 118 may include an aperture that the crossbar 130 is slid through.

The handle portion 124 may also be detachable from the elongated body 118. Similarly, the engagement member 126 may be detachable from the elongated body 118. In some instances, the elongated body 118 may be telescopic. In this manner, the railcar tool 116 may be disassembled and reassembled as need. In other instances, the railcar tool 116 may be a unitary structure. For example, the elongated body 118 and the engagement member 126 may be welded together or the like. Any means may be used to assemble the various components of the railcar tool 116.

Figure 4:
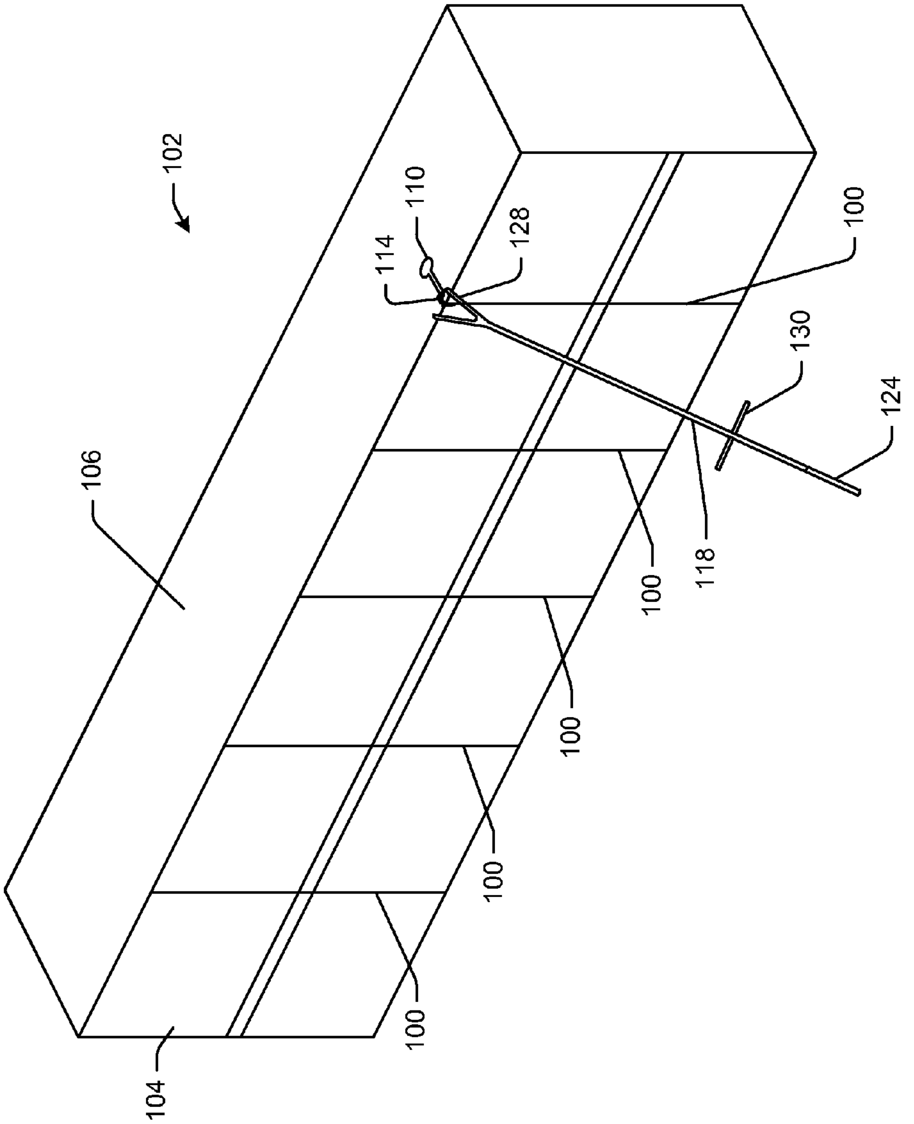
FIG. 4 schematically depicts a railcar tool and a railcar assembly in accordance with one or more embodiments of the disclosure.

As depicted in FIG. 4, the user may grasp the handle portion 124 with one hand and the crossbar 130 with the other hand. The user may then guide the V-shaped engagement member 128 along the cable 100. Once the V-shaped engagement member 128 is positioned adjacent to the fastened chain linked end 114 of the cable 100, the user may apply a force to the cable 100 by pressing the V-shaped engagement member 128 against the cable 100 to disengage the chain linked end 114 from the keyhole slot 110. The user also may apply a twisting motion using the crossbar 130 to further assist in disengaging the chain linked end 114 from the keyhole slot 110. In this manner, the user, standing on the ground, may disengage the cable 100 from the railcar 102.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A tool for disconnecting a cable from a top of a railcar, the tool consisting of:

an elongated body comprising a first end and a second end spaced apart a distance sufficient to enable a user standing at ground level to disconnect the cable from the top of the railcar using the tool;

a handle portion disposed about the first end of the elongated body;

a V-shaped engagement member disposed about the second end of the elongated body, wherein the V-shaped engagement member faces away from the handle portion and is configured to engage the cable at the top of the railcar; and a crossbar handle attached to the elongated body, wherein the crossbar handle is located nearer the first end of the elongated body than the second end of the elongated body, and wherein the elongated body, the V-shaped engagement member, and the crossbar handle are a unitary structure.

2. A tool for disconnecting a cable from a top of a railcar, the tool comprising:

an elongated substantially straight body comprising a first end and a second end spaced apart a distance sufficient to enable a user standing at ground level to disconnect the cable from the top of the railcar using the tool;

a handle portion disposed about the first end of the elongated body;

a V-shaped engagement member disposed about the second end of the elongated body, wherein the V-shaped engagement member faces away from the handle portion and is configured to engage the cable at the top of the railcar, and wherein the elongated body and the V-shaped engagement member are a unitary structure; and a crossbar handle attached to the elongated body, wherein the crossbar handle is located nearer the first end of the elongated body than the second end of the elongated body.

3. The tool of claim 2, wherein the crossbar handle is substantially transverse to the elongated body.

4. The tool of claim 2, wherein the crossbar handle comprises a grip.

5. The tool of claim 2, wherein the handle portion is detachable from the elongated body.

6. The tool of claim 2, wherein the crossbar handle extends out from both sides of the elongated body.

7. The tool of claim 2, wherein the elongated body, the V-shaped engagement member, and the crossbar handle are a unitary structure.

8. The tool of claim 2, wherein the elongated body comprises an aperture in which the crossbar handle is disposed.

9. A method for manufacturing a tool for disconnecting a cable from a top of a railcar, the method comprising:

providing an elongated substantially straight body comprising a first end and a second end spaced apart a distance sufficient to enable a user standing at ground level to disconnect the cable from the top of the railcar using the tool;

attaching a handle about the first end of the elongated body;

attaching a V-shaped engagement member about the second end of the elongated body, wherein the V-shaped engagement member faces away from the handle portion and is configured to engage the cable at the railcar, and wherein the elongated body and the engagement member are a unitary structure; and attaching a crossbar handle to the elongated body, wherein the crossbar handle is located nearer the first end of the elongated body than the second end of the elongated body.

10. The method of claim 9, wherein the crossbar handle extends out from both sides of the elongated body.

11. The method of claim 9, wherein the elongated body, the V-shaped engagement member, and the crossbar handle are a unitary structure.

12. The method of claim 9, wherein the elongated body comprises an aperture in which the crossbar handle is disposed.

* * * * *